US012614478B2

(12) United States Patent
Youm et al.

(10) Patent No.: US 12,614,478 B2
(45) Date of Patent: Apr. 28, 2026

(54) STEREOSCOPIC IMAGE GENERATING DEVICE AND METHOD OF OPERATING THE SAME

(71) Applicant: Electronics and Telecommunications Research Institute, Daejeon (KR)

(72) Inventors: Wooseup Youm, Daejeon (KR); Chunwon Byun, Daejeon (KR); Chan-mo Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/420,052

(22) Filed: Jan. 23, 2024

(65) Prior Publication Data

US 2024/0331589 A1     Oct. 3, 2024

(30) Foreign Application Priority Data

Apr. 3, 2023     (KR) ........................ 10-2023-0043554

(51) Int. Cl.
　*G09G 3/00*　　　(2006.01)
　*G06F 3/01*　　　(2006.01)
　*G06T 3/40*　　　(2024.01)

(52) U.S. Cl.
　CPC ............. *G09G 3/001* (2013.01); *G06F 3/012* (2013.01); *G06F 3/013* (2013.01); *G06T 3/40* (2013.01);
(Continued)

(58) Field of Classification Search
None
See application file for complete search history.

(56) References Cited

U.S. PATENT DOCUMENTS

| | | | |
|---|---|---|---|
| 2008/0024597 A1 | 1/2008 | Yang et al. | |
| 2017/0160798 A1 | 6/2017 | Lanman et al. | |
| (Continued) | | | |

FOREIGN PATENT DOCUMENTS

| | | |
|---|---|---|
| KR | 10-2017-0022736 A | 3/2017 |
| KR | 10-2019-0131508 A | 11/2019 |
| KR | 10-2022-0086866 A | 6/2022 |

OTHER PUBLICATIONS

Korean Office Action Issued on Aug. 18, 2025, in Counterpart Korean Patent Application No. 10-2023-0043554 (7 Pages in English, 7 Pages in Korean).

*Primary Examiner* — Nicholas J Lee
(74) *Attorney, Agent, or Firm* — NSIP Law

(57) ABSTRACT

Disclosed is a method of operating a stereoscopic image generating device communicating with a rendering server device including obtaining first tracking data by tracking a motion of a user during a reference time interval, obtaining second tracking data by tracking a viewpoint of the user during the reference time interval, providing the first tracking data to the rendering server device, receiving one or more focus image data corresponding to the first tracking data from the rendering server device, extracting one or more areas corresponding to the tracked viewpoint from each of the one or more focus image data based on the second tracking data, generating multifocal virtual reality (VR) image data by up-scaling the extracted one or more areas, and visually providing, by a display device of the stereoscopic image generating device, the multifocal VR image data to the user.

13 Claims, 5 Drawing Sheets

(52) U.S. Cl.
CPC ... *G09G 2340/045* (2013.01); *G09G 2354/00*
(2013.01); *G09G 2370/02* (2013.01)

(56) References Cited

U.S. PATENT DOCUMENTS

| | | | |
|---|---|---|---|
| 2017/0295373 A1 | 10/2017 | Zhang | |
| 2018/0284464 A1* | 10/2018 | Lu | G02F 1/29 |
| 2019/0089898 A1 | 3/2019 | Kim et al. | |
| 2019/0310472 A1 | 10/2019 | Schilt et al. | |
| 2020/0143516 A1* | 5/2020 | Martin | G06T 3/60 |
| 2020/0393676 A1 | 12/2020 | Hua et al. | |

* cited by examiner

STEREOSCOPIC IMAGE GENERATING DEVICE AND METHOD OF OPERATING THE SAME

CROSS-REFERENCE TO RELATED APPLICATIONS

This application claims priority under 35 U.S.C. § 119 to Korean Patent Application No. 10-2023-0043554 filed on Apr. 3, 2023, in the Korean Intellectual Property Office, the disclosures of which are incorporated by reference herein in their entireties.

BACKGROUND

Embodiments of the present disclosure described herein relate to a stereoscopic image generating device, and more particularly, relate to a stereoscopic image generating device and a method of operating the same.

Multifocal stereoscopic images allow a user viewing stereoscopic images to feel a greater sense of space and immersion than monofocal stereoscopic images. However, one or more focal length-specific stereoscopic images are required to create multifocal stereoscopic images. To receive the one or more focal length-specific stereoscopic images from an external server, it takes more time and requires a wider communication bandwidth. Moreover, when a stereoscopic image corresponding to the user's viewpoint is received from the external server in real time depending on changes in the user's viewpoint, the time required to receive the stereoscopic image from the external server further increases.

Accordingly, a device, which reduces the time required to receive one or more focal length-specific stereoscopic images, and the required communication bandwidth by directly extracting an image corresponding to the user's viewpoint from an image received from the external server, is required to create a stereoscopic image that stably provides a user with a higher sense of space and immersion.

SUMMARY

Embodiments of the present disclosure provide a stereoscopic image generating device and a method of operating the same.

According to an embodiment, a method of operating a stereoscopic image generating device communicates with a rendering server device and includes obtaining first tracking data by tracking a motion of a user during a reference time interval, obtaining second tracking data by tracking a viewpoint of the user during the reference time interval, providing the first tracking data to the rendering server device, receiving one or more focus image data corresponding to the first tracking data from the rendering server device, extracting one or more areas corresponding to the tracked viewpoint from each of the one or more focus image data based on the second tracking data, generating multifocal virtual reality (VR) image data by up-scaling the extracted one or more areas, and visually providing, by a display device of the stereoscopic image generating device, the multifocal VR image data to the user.

In some embodiments, the display device includes a binocular display device and a variable focus optical system. The providing, by the display device of the stereoscopic image generating device, of the multifocal VR image data to the user visually includes playing, by the binocular display device, the multifocal VR image data, and adjusting, by the variable focus optical system, an angle at which the multifocal VR image data is incident on eyes of the user for a respective focal length, by synchronizing a time point, at which the multifocal VR image data is played, with a time point, at which the angle at which the multifocal VR image data is incident on the eyes of the user is adjusted for the respective focal length.

In some embodiments, the tracked viewpoint includes a right-eye viewpoint and a left-eye viewpoint of the user. The multifocal VR image data includes first right-eye image data corresponding to the right-eye viewpoint, and first left-eye image data corresponding to the left-eye viewpoint at a first focal length, and second right-eye image data corresponding to the right-eye viewpoint, and second left-eye image data corresponding to the left-eye viewpoint at a second focal length.

In some embodiments, the one or more focus image data is data in which original image data corresponding to the first tracking data is down-scaled by the rendering server device. The receiving of the one or more focus image data corresponding to the first tracking data from the rendering server device includes receiving filter data corresponding to an image filter used in the down-scaling from the rendering server device.

In some embodiments, the generating of the multifocal VR image data by up-scaling the extracted one or more areas includes generating up-scale image data by up-scaling the extracted one or more areas based on the filter data, and generating the multifocal VR image data based on the up-scale image data.

In some embodiments, the obtaining of the second tracking data by tracking the viewpoint of the user during the reference time interval includes tracking a movement of a face of the user and a movement of a pupil of the user during the reference time interval, and obtaining the second tracking data based on the tracked movement of the face and the tracked movement of the pupil.

In some embodiments, the tracking of the movement of the face of the user and the movement of the pupil of the user during the reference time interval includes tracking the movement of the face by tracking a pan, a tilt, and a roll of the face of the user.

According to an embodiment, a stereoscopic image generating device includes a sensor device that obtains first tracking data by tracking a motion of a user during a reference time interval, provides the first tracking data to a rendering server device, and obtains second tracking data by tracking a viewpoint of the user during the reference time interval, an image interface device that receives one or more focus image data corresponding to the first tracking data from the rendering server device, a signal processing device that extracts one or more areas corresponding to the tracked viewpoint from each of the one or more focus image data based on the second tracking data and generates multifocal VR image data by up-scaling the extracted one or more areas, and a display device that visually provides the multifocal VR image data to the user.

In some embodiments, the display device includes a binocular display device that plays the multifocal VR image data, and a variable focus optical system that adjusts an angle at which the multifocal VR image data is incident on eyes of the user for a respective focal length, by synchronizing a time point, at which the multifocal VR image data is played, with a time point, at which the angle at which the multifocal VR image data is incident on the eyes of the user is adjusted for the respective focal length.

In some embodiments, the sensor device includes a first sensor device that generates the first tracking data by tracking the motion of the user during the reference time interval, and a second sensor device that generates the second tracking data by tracking the viewpoint of the user during the reference time interval.

In some embodiments, the signal processing device includes an image decoder that decodes the one or more focus image data received from the image interface device, a viewpoint synthesizer that extracts the one or more areas corresponding to the tracked viewpoint from the decoded one or more focus image data, an image corrector that generates the multifocal VR image data by up-scaling the extracted one or more areas, and a driving signal generator that generates a driving synchronization signal for driving the display device such that the display device visually provides the multifocal VR image data to the user.

In some embodiments, the one or more focus image data are data in which original image data corresponding to the first tracking data is down-scaled by the rendering server device. The image interface device receives filter data corresponding to an image filter used in the down-scaling from the rendering server device.

In some embodiments, the signal processing device includes an up-scaling module that receives the filter data from the image interface device and to generate up-scale image data by up-scaling the extracted one or more areas based on the filter data.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that an ordinary one in the art easily implements the present disclosure.

The terms "module", etc. to be used below and function blocks illustrated in drawings may be implemented in the form of a software component, a hardware component, or a combination thereof. Below, to describe the technical idea of the present disclosure clearly, a description associated with identical components will be omitted.

Figure 1:
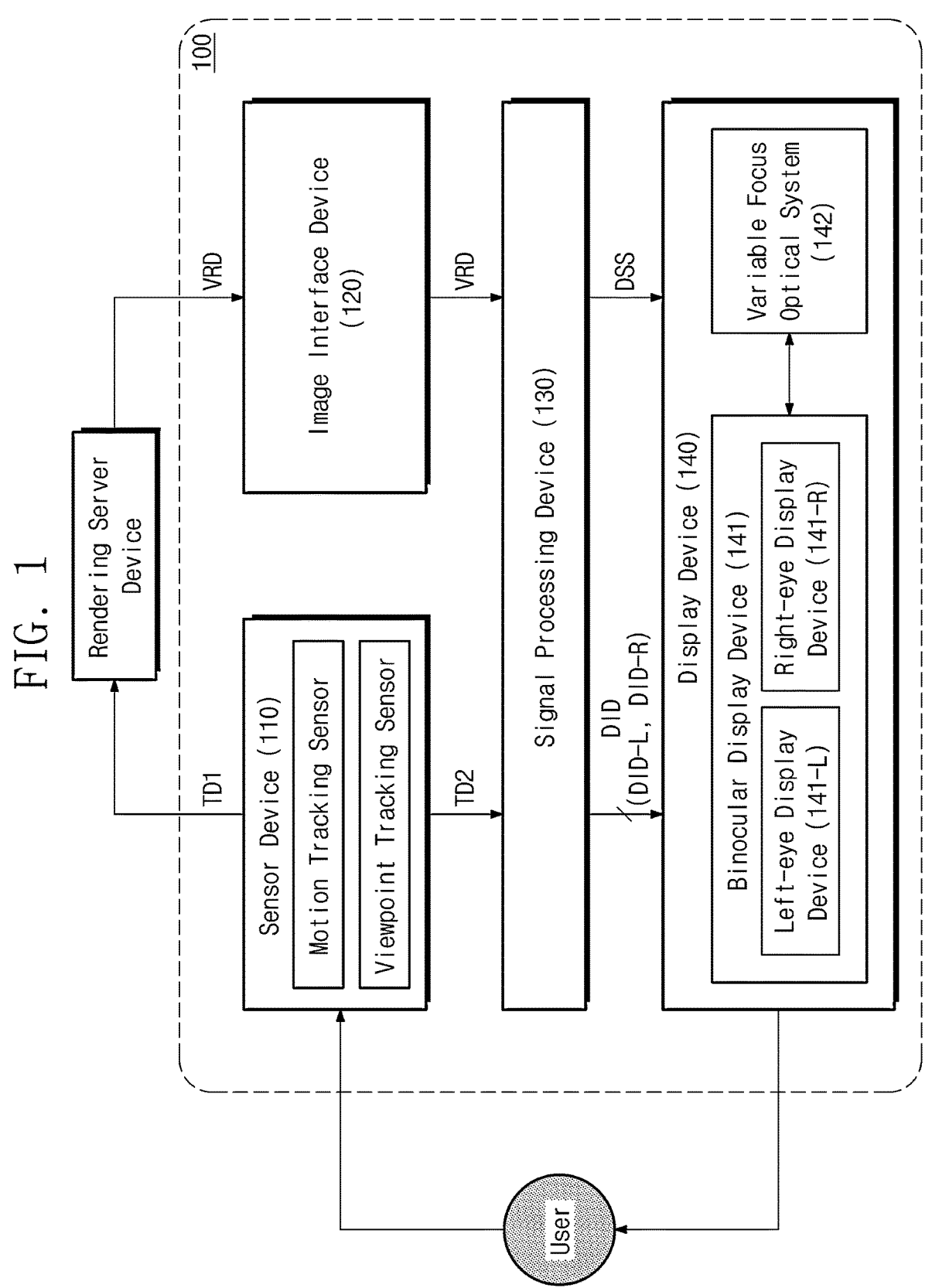
FIG. 1 is a block diagram illustrating a stereoscopic image generating device, according to an embodiment of the present disclosure.

FIG. 1 is a block diagram illustrating a stereoscopic image generating device, according to an embodiment of the present disclosure. Referring to FIG. 1, a stereoscopic image generating device 100 is shown.

The stereoscopic image generating device 100 may communicate with an external rendering server device. The rendering server device may render a stereoscopic image corresponding to a user's movement. The stereoscopic image generating device 100 may recognize the user's movements, may generate multifocal stereoscopic image data based on image data obtained from the rendering server device, and may visually provide the user with the multifocal stereoscopic image data. The stereoscopic image generating device 100 may include a sensor device 110, an image interface device 120, a signal processing device 130, and a display device 140.

The sensor device 110 may include a motion tracking sensor and a viewpoint tracking sensor.

The motion tracking sensor may generate first tracking data TD1 by tracking the user's motion during a reference time interval. The first tracking data TD1 may include information corresponding to a change in the user's location in 3D space or a change in the location of the user's head.

The viewpoint tracking sensor may obtain second tracking data TD2 by tracking the user's viewpoint during the reference time interval. The second tracking data TD2 may include information corresponding to the movement of the user's face and the movement of the user's pupil. The second tracking data may track the movement of the user's left-eye pupil and right-eye pupil.

The sensor device 110 may track facial movements by tracking the pan, tilt, and roll of the user's face. The pan of the face may correspond to the left and right rotation of the user's face. The tilt of the face may correspond to the up and down rotation of the user's face. The roll of the face may correspond to side-to-side tilting.

The sensor device 110 may provide the first tracking data TD1 to the rendering server device outside the stereoscopic image generating device 100. The sensor device 110 may provide the second tracking data TD2 to the signal processing device 130.

The image interface device 120 may receive one or more focus image data VRD corresponding to the first tracking data TD1 from the rendering server device. The one or more focus image data VRD may mean image data regarding one focus or image data regarding two or more focuses. The one or more focus image data VRD may include image information and depth information, which correspond to each of one or more focal lengths. In other words, the image interface device 120 may receive image information and depth information corresponding to each of the one or more focal lengths from the server rendering device. Detailed descriptions of the one or more focus image data VRD will be described later with reference to FIGS. 3 and 4.

The one or more focus image data VRD may be image data rendered in response to the first tracking data TD1, and may include information about the image corresponding to all rotation angles of the user's gaze. In other words, the one or more focus image data VRD may include information about the image corresponding to the user's 360-degree gaze at the user's changed location in a three-dimensional (3D) space.

The one or more focus image data VRD may be data in which original image data is down-scaled by the rendering server device. The original image data may be initial image data rendered by the rendering server device in response to the first tracking data TD1 and may include one or more focal length-specific image data.

The image interface device 120 may receive filter data used when the rendering server device performs down-scaling on the original image data to one or more focus image data. The filter data may include information about filter parameters of the image filter used to perform down-scaling on the original image data and the applied offset filter.

The image interface device 120 may receive additional data from the rendering server device. The additional data may include information about differences between one or more focal length-specific image data of the original image data. While the filter data and the additional data are included in the one or more focus image data VRD, the image interface device 120 may receive the one or more focus image data VRD.

The image interface device 120 may provide the signal processing device 130 with the one or more focus image data VRD received from the rendering server device.

The signal processing device 130 may receive the one or more focus image data VRD from the image interface device 120. The signal processing device 130 may receive the second tracking data TD2 from the sensor device 110.

The signal processing device 130 may extract one or more areas corresponding to the tracked viewpoint of the second tracking data TD2 from each of the one or more focus image data VRD based on the second tracking data TD2. The operation of extracting one or more areas corresponding to the tracked viewpoint of the signal processing device 130 may be referred to as viewpoint synthesis. Detailed descriptions of viewpoint synthesis will be described later with reference to FIG. 4.

The signal processing device 130 may generate multifocal virtual reality (VR) image data by up-scaling one or more extracted areas. The multifocal VR image data may include information about one or more focal length-specific VR images corresponding to the user's location and the user's viewpoint in the 3D space.

The signal processing device 130 may generate a driving signal for driving the display device 140 such that the display device 140 displays multifocal VR image data.

The driving signal may include driving image data DID to be displayed on the display device 140. The driving image data DID may include information about the multifocal VR image data, and a time period in which the display device 140 plays the multifocal VR image data. The driving image data DID may include left-eye driving image data DID-L provided to the user's left-eye and right-eye driving image data DID-R provided to the user's right-eye.

The driving signal may include a driving synchronization signal DSS for driving the display device 140 such that the display device 140 adjusts an angle, at which multifocal VR image data is incident on the user's eyes for each focal length. Detailed descriptions of the driving synchronization signal DSS will be described later together with the display device 140.

The display device 140 may visually provide multifocal VR image data to the user based on the driving signal. The display device 140 may receive the driving image data DID and the driving synchronization signal DSS from the signal processing device. The display device 140 may include a binocular display device 141 and a variable focus optical system 142.

The binocular display device 141 may play multifocal VR image data. The binocular display device 141 may include a left-eye display device 141-L corresponding to the user left-eye and a right-eye display device 141-R corresponding to the user right-eye. The left-eye display device 141-L may display the left-eye driving image data DID-L. The right-eye display device 141-R may display the right-eye driving image data DID-R.

The variable focus optical system 142 may be located between the binocular display device 141 and the user's eyes. The variable focus optical system 142 may adjust the angle at which multifocal VR image data is incident on the user's eyes for each focal length. In other words, the variable focus optical system 142 may operate such that the display device 140 is configured similarly to a light field display device.

The variable focus optical system 142 may receive the driving synchronization signal DSS from the signal processing device 130. The variable focus optical system 142 may adjust the angle at which multifocal VR image data is incident on the user's eyes for each focal length, by synchronizing a time point, at which multifocal VR image data is played, with a time point, at which the angle at which multifocal VR image data is incident on the user's eyes is adjusted for each focal length, based on the driving synchronization signal DSS.

For example, when the binocular display device 141 plays the driving image data DID corresponding to a first time point, the variable focus optical system 142 may adjust an angle, at which multifocal VR image data corresponding to the first viewpoint is incident on the user's eyes for each focal length, based on the driving synchronization signal DSS.

Figure 2:
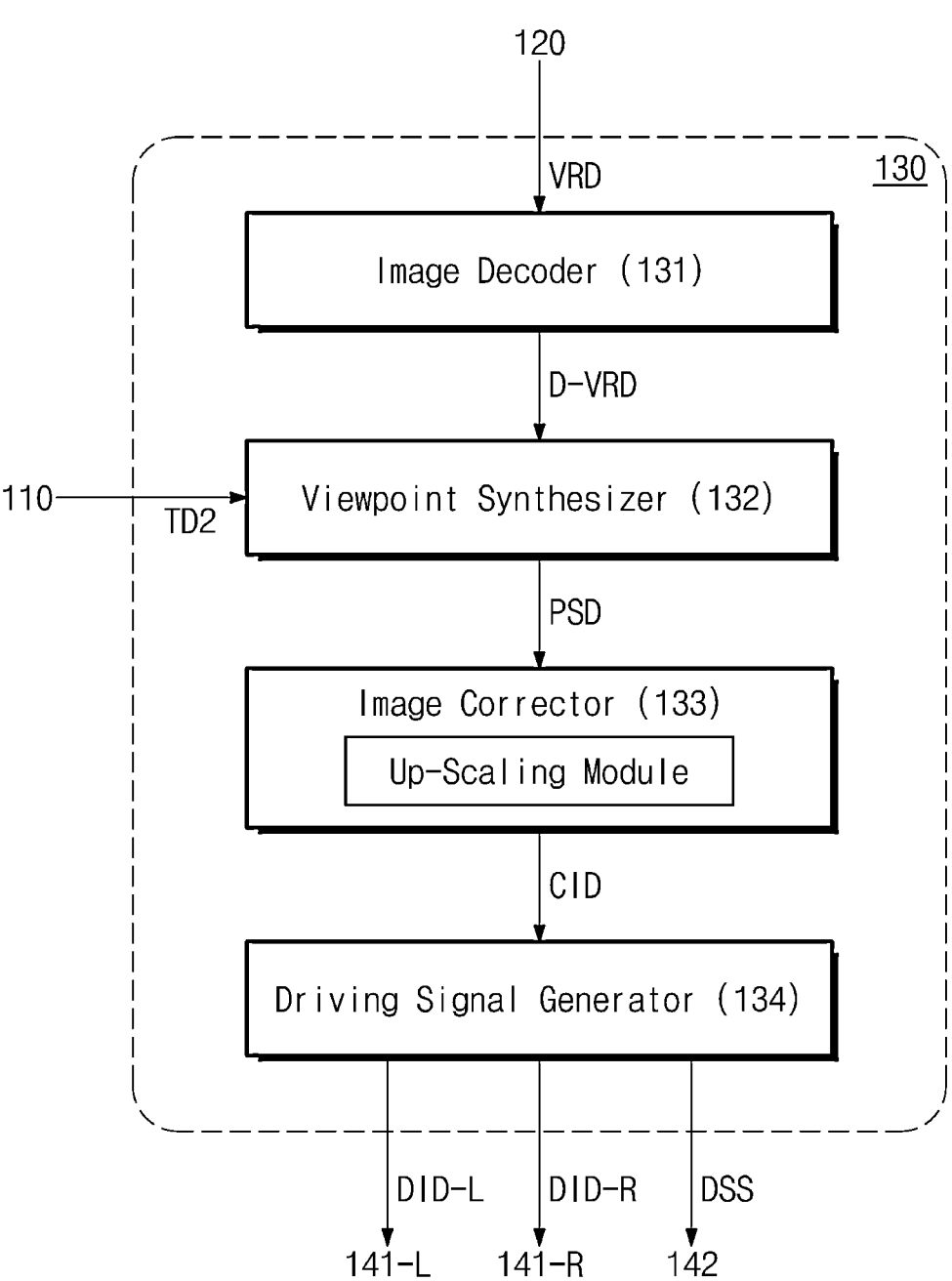
FIG. 2 is a block diagram for describing the signal processing device of FIG. 1, according to some embodiments of the present disclosure.

FIG. 2 is a block diagram for describing the signal processing device of FIG. 1, according to some embodiments of the present disclosure. Referring to FIG. 2, the signal processing device 130 is shown. The signal processing device 130 of FIG. 2 may correspond to the signal processing device 130 of FIG. 1.

The signal processing device 130 may include an image decoder 131, a viewpoint synthesizer 132, an image corrector 133, and a driving signal generator 134.

The image decoder 131 may receive the one or more focus image data VRD from the image interface device 120. The image decoder 131 may decode the one or more focus image data VRD and may generate one or more decoded focus image data D-VRD.

The viewpoint synthesizer 132 may receive the second tracking data TD2 from the sensor device 110. The viewpoint synthesizer 132 may receive the one or more decoded focus image data D-VRD from the image decoder 131.

The viewpoint synthesizer 132 may extract one or more areas corresponding to a user's viewpoint from one or more decoded focus image data D-VRD based on the second tracking data TD2 and may create viewpoint synthesis data PSD. The viewpoint synthesis data PSD may indicate a portion corresponding to the user's viewpoint (i.e., a specific viewing angle) in the one or more decoded image data D-VRD. Detailed descriptions thereof will be described later with reference to FIG. 4.

The image corrector 133 may receive the viewpoint synthesis data PSD from the viewpoint synthesizer 132. The image corrector 133 may receive additional data and filter data from the image interface device 120.

The image corrector 133 may generate correction image data CID by correcting the viewpoint synthesis data PSD based on the additional data and the filter data. The correction image data CID may also be referred to as "multifocal VR image data". The image corrector 133 may improve the image quality of the viewpoint synthesis data PSD based on the additional data.

The image corrector 133 may include an up-scaling module. The up-scaling module may generate up-scaling image data by up-scaling the synthesis data PSD based on the filter data. The resolution of the up-scaling image data may be higher than the resolution of the viewpoint synthesis data PSD.

The driving signal generator 134 may receive the correction image data CID from the image corrector 133. The driving signal generator 134 may generate the left-eye driving image data DID-L, the right-eye driving image data DID-R, and the driving synchronization signal DSS based on the correction image data CID.

The driving signal generator 134 may provide the left-eye driving image data DID-L to the left-eye display device 141-L. The driving signal generator 134 may provide the right-eye driving image data DID-R to the right-eye display device 141-R. The driving signal generator 134 may provide the driving synchronization signal DSS to the variable focus optical system 142.

Figure 3:
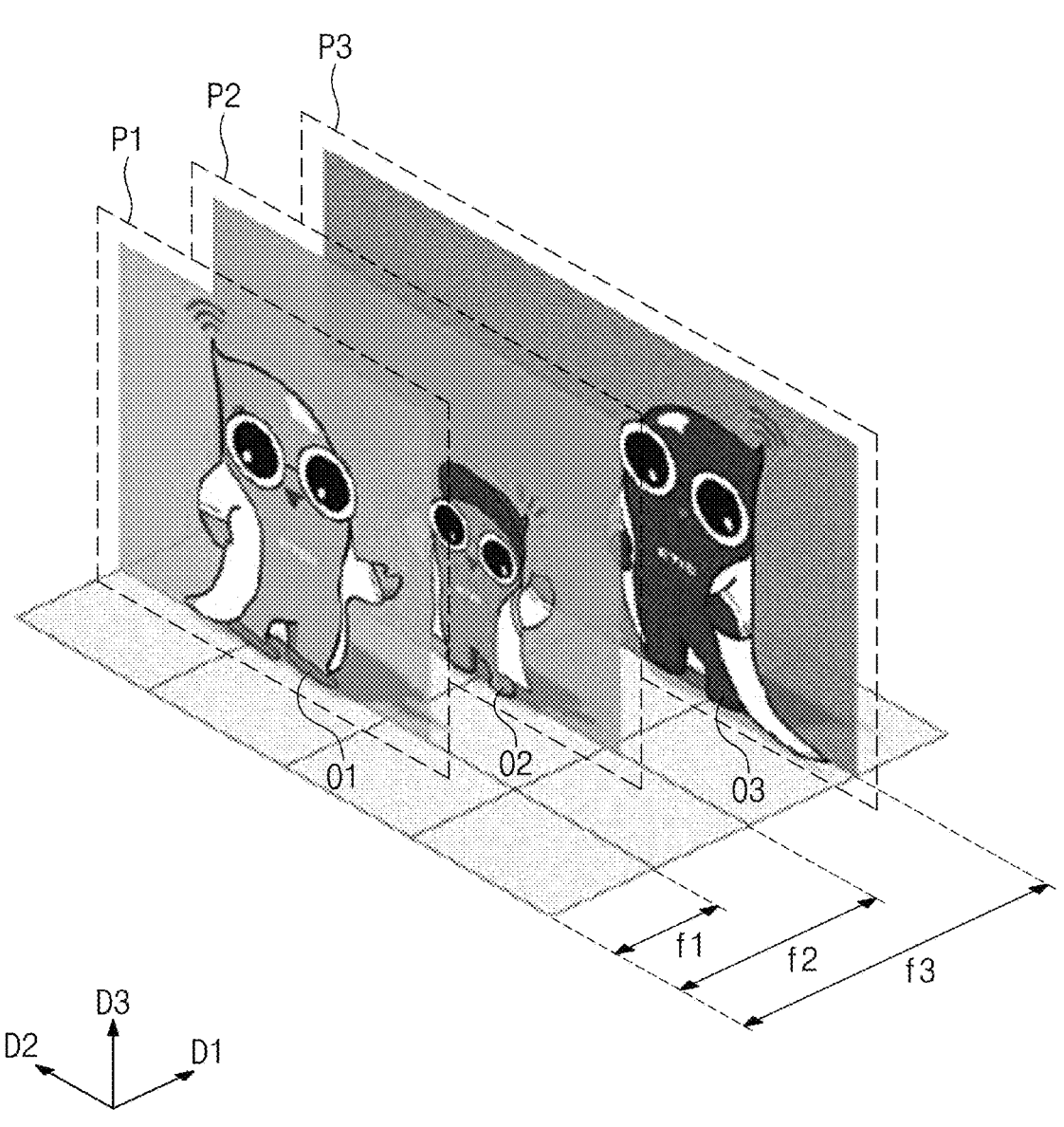
FIG. 3 is a diagram for describing one or more focus image data, according to some embodiments of the present disclosure.

FIG. 3 is a diagram for describing one or more focus image data, according to some embodiments of the present disclosure. Referring to FIG. 3, some of a process in which a rendering server device generates one or more focus image data is described.

The rendering server device may generate one or more focus image data based on one or more focal length-specific image data. For example, a first plane P1 indicating image data of a first focal length f1 in a first direction D1 may include a first object O1. A second plane P2 indicating image data of a second focal length f2 in the first direction D1 may include a second object O2. A third plane P3 indicating image data of a third focal length f3 in the first direction D1 may include a third object O3.

The rendering server device may generate one or more focus image data including the first to third objects O1 to O3 based on the first to third planes P1 to P3. Detailed descriptions of one or more focus image data including the first to third objects O1 to O3 will be described later with reference to FIG. 4.

FIG. 3 shows that the first to third planes P1 to P3 are finite planes, but the scope of the present disclosure is not limited thereto. For example, a size of each of the first to third planes P1 to P3 is not limited thereto. The first to third planes P1 to P3 may not be planes, and the number of focal lengths may be 2 or less or 4 or more.

Figure 4:
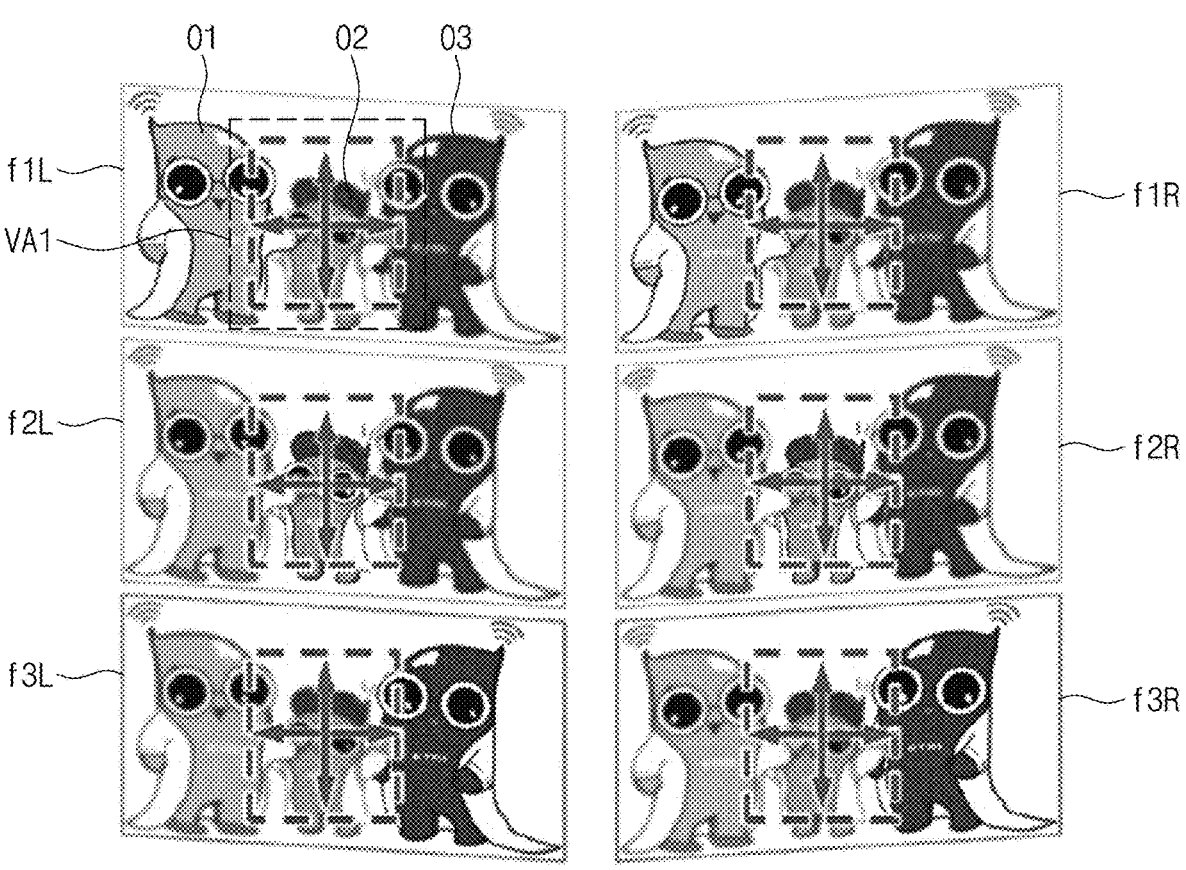
FIG. 4 is a diagram for describing a viewpoint synthesis operation, according to some embodiments of the present disclosure.

FIG. 4 is a diagram for describing a viewpoint synthesis operation, according to some embodiments of the present disclosure. Referring to FIG. 4, one or more focus image data and viewpoint synthesis operations are described. First to third objects O1 to O3 in FIG. 4 may correspond to the first to third objects O1 to O3 in FIG. 3.

One or more focus image data may include left-eye and right-eye image data for one or more respective focal lengths.

For example, the data may include a left-eye image data f1L of a first focal length and a right-eye image data f1R of the first focal length. The signal processing device may generate left-eye driving image data based on the left-eye image data f1L of the first focal length. The signal processing device may generate right-eye driving image data based on the right-eye image data f1R of the first focal length.

On the basis of the left-eye image data f1L of the first focal length and the right-eye image data f1R of the first focal length, the first object O1 may be displayed clearly, and the second object O2 and the third object O3 may be displayed to be dimmed.

For example, the one or more focus image data may include left-eye image data f2L of a second focal length and right-eye image data f2R of the second focal length. The signal processing device may generate left-eye driving image data based on the left-eye image data f2L of the second focal length. The signal processing device may generate right-eye driving image data based on the right-eye image data f2R of the second focal length.

On the basis of the left-eye image data f2L of the second focal length and the right-eye image data f2R of the second focal length, the second object O2 may be displayed clearly, and the first object O1 and the third object O3 may be displayed to be dimmed.

For example, the one or more focus image data may include left-eye image data f3L of a third focal length and right-eye image data f3R of the third focal length. The signal processing device may generate left-eye driving image data based on the left-eye image data f3L of the third focal length. The signal processing device may generate right-eye driving image data based on the right-eye image data f3R of the third focal length.

On the basis of the left-eye image data f3L of the third focal length and the right-eye image data f3R of the third focal length, the third object O3 may be displayed clearly, and the first object O1 and the second object O2 may be displayed to be dimmed.

The signal processing device may extract an area corresponding to the user's tracked viewpoint from one or more focus image data.

For example, a first area VA1 corresponding to the user's tracked left-eye viewpoint may be displayed as the square of a dotted line in the left-eye image data f1L of the first focal length. The first area VA1 may move in a direction indicated by horizontal and vertical arrows depending on changes in the user's tracked viewpoint. FIG. 4 shows only the first area VA1. However, second to sixth areas may be extracted from the right-eye image data f1R of the first focal length, the left-eye image data f2L of the second focal length, the right-eye image data f2R of the second focal length, the left-eye image data f3L of the third focal length, and the right-eye image data f3R of the third focal length. The viewpoint synthesis data may include the first to sixth areas.

Although FIG. 4 shows that one or more focus image data is a finite plane, the scope of the present disclosure is not limited thereto. For example, each of the one or more focus image data may not be a plane.

Figure 5:
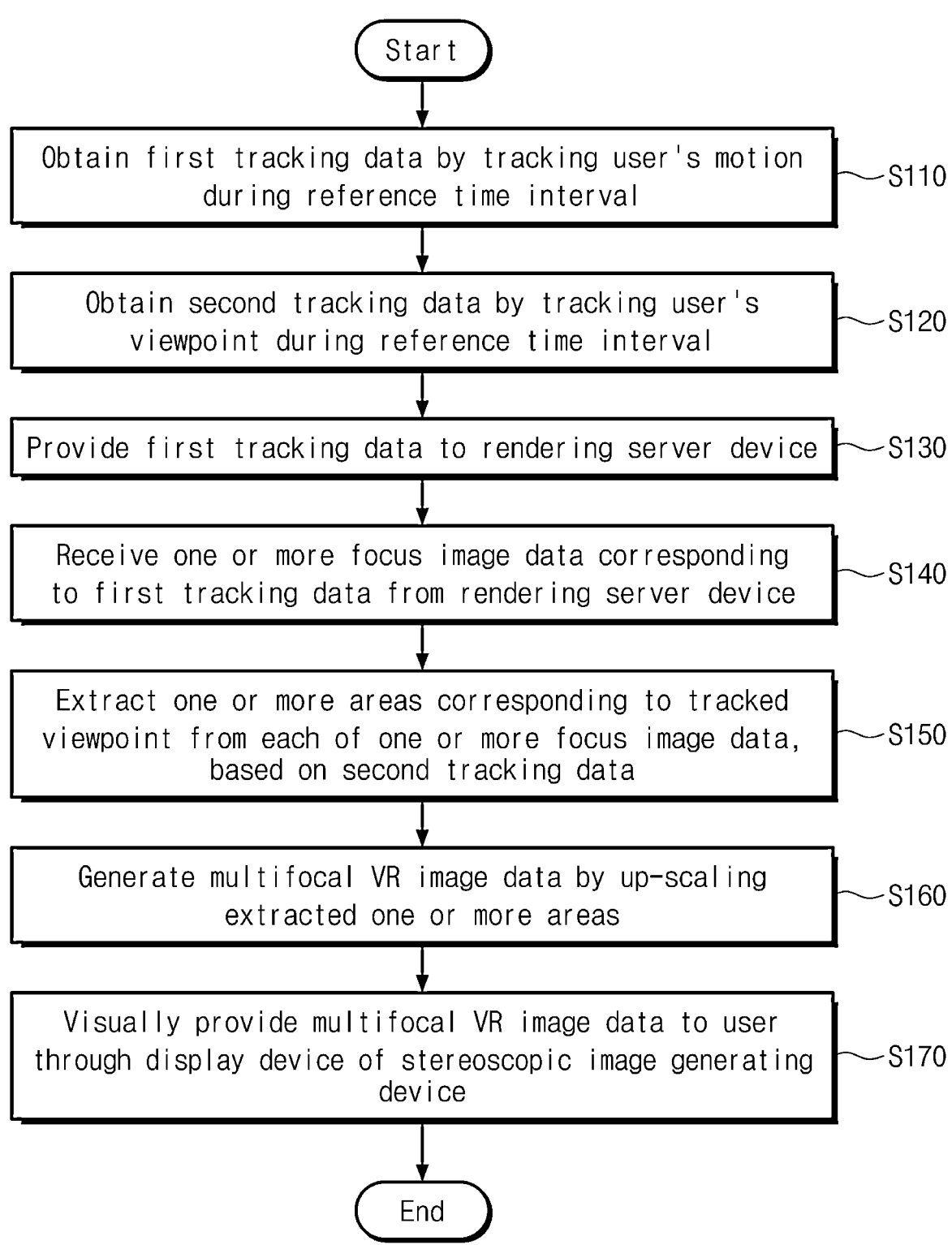
FIG. 5 is a flowchart for describing a method of operating a stereoscopic image generating device, according to some embodiments of the present disclosure.

FIG. 5 is a flowchart for describing a method of operating a stereoscopic image generating device, according to some embodiments of the present disclosure. Referring to FIG. 5, a method of operating a stereoscopic image generating device is described. The stereoscopic image generating device of FIG. 5 may correspond to the stereoscopic image generating device 100 of FIG. 1.

In operation S110, the stereoscopic image generating device may obtain first tracking data by tracking the user's motion during a reference time interval.

In operation S120, the stereoscopic image generating device may obtain second tracking data by tracking the user's viewpoint during the reference time interval.

In some embodiments, operation S110 may include tracking the movement of the user's face and the movement of the user's pupil during the reference time interval, and obtaining second tracking data based on the tracked movement of the face and the tracked movement of the pupil.

In operation S130, the stereoscopic image generating device may provide first tracking data to a rendering server device.

In operation S140, the stereoscopic image generating device may receive one or more focus image data corresponding to first tracking data from the rendering server device.

In operation S150, the stereoscopic image generating device may extract one or more areas corresponding to the tracked viewpoint from each of one or more focus image data, based on the second tracking data.

In operation S160, the stereoscopic image generating device may generate multifocal VR image data by up-scaling the one or more extracted areas.

In some embodiments, operation S160 may include generating up-scale image data by up-scaling the extracted areas based on filter data, and generating multifocal VR image data based on the up-scale image data.

In operation S170, the stereoscopic image generating device may visually provide multifocal VR image data to the user through a display device of the stereoscopic image generating device.

In some embodiments, operation S170 may include playing, by a binocular display, multifocal VR image data, and adjusting, by a variable focus optical system, an angle, at which the multifocal VR image data is incident on the user's eyes for each focal length, in synchronization with the binocular display.

The above description refers to detailed embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments described above, it will be apparent to those of ordinary skill in the art that various changes and modifications may be made thereto without departing from the spirit and scope of the present disclosure as set forth in the following claims.

According to an embodiment of the present disclosure, a stereoscopic image generating device and a method of operating the same are provided.

Moreover, it is possible to provide the stereoscopic image generating device that receives one or more focal length-specific stereoscopic images from an external server, directly extracts a stereoscopic image corresponding to a user's viewpoint, and thus quickly generates multifocal stereoscopic images depending on to changes in the user's viewpoint, and a method of operating the same.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating a stereoscopic image generating device communicating with a rendering server device, the method comprising:

obtaining first tracking data by tracking a motion of a user during a reference time interval;

obtaining second tracking data by tracking a viewpoint of the user during the reference time interval;

providing the first tracking data to the rendering server device;

generating, by the rendering server device, one or more focus image data by downscaling original image data corresponding to the first tracking data;

receiving, from the rendering server device, the one or more focus image data generated by downscaling the original image data and filter data used when the rendering server device performs the down-scaling on the original image data;

extracting one or more areas corresponding to the tracked viewpoint from each of the one or more focus image data based on the second tracking data;

generating multifocal virtual reality (VR) image data by up-scaling the extracted one or more areas based on the filter data; and visually providing, by a display device of the stereoscopic image generating device, the multifocal VR image data to the user.

2. The method of claim 1, wherein the display device includes a binocular display device and a variable focus optical system, and wherein the providing, by the display device of the stereoscopic image generating device, of the multifocal VR image data to the user visually includes:

playing, by the binocular display device, the multifocal VR image data; and adjusting, by the variable focus optical system, an angle at which the multifocal VR image data is incident on eyes of the user for a respective focal length, by synchronizing a time point, at which the multifocal VR image data is played, with a time point, at which the angle at which the multifocal VR image data is incident on the eyes of the user is adjusted for the respective focal length.

3. The method of claim 1, wherein the tracked viewpoint includes a right-eye viewpoint and a left-eye viewpoint of the user, and wherein the multifocal VR image data includes:

first right-eye image data corresponding to the right-eye viewpoint, and first left-eye image data corresponding to the left-eye viewpoint at a first focal length; and second right-eye image data corresponding to the right-eye viewpoint, and second left-eye image data corresponding to the left-eye viewpoint at a second focal length.

4. The method of claim 1, wherein the receiving of the one or more focus image data corresponding to the first tracking data from the rendering server device includes:

receiving filter data corresponding to an image filter used in the down-scaling from the rendering server device.

5. The method of claim 4, wherein the generating of the multifocal VR image data by up-scaling the extracted one or more areas further comprises:

generating the multifocal VR image data based on the up-scale image data.

6. The method of claim 1, wherein the obtaining of the second tracking data by tracking the viewpoint of the user during the reference time interval includes:

tracking a movement of a face of the user and a movement of a pupil of the user during the reference time interval; and obtaining the second tracking data based on the tracked movement of the face and the tracked movement of the pupil.

7. The method of claim 6, wherein the tracking of the movement of the face of the user and the movement of the pupil of the user during the reference time interval includes:

tracking the movement of the face by tracking a pan, a tilt, and a roll of the face of the user.

8. A stereoscopic image generating device, comprising:

a sensor device configured to obtain first tracking data by tracking a motion of a user during a reference time interval, and provide the obtained first tracking data to a rendering server device, and configured to obtain second tracking data by tracking a viewpoint of the user during the reference time interval;

an image interface device configured to receive, from the rendering server device, one or more focus image data generated by downscaling original image data corresponding to the first tracking data and filter data used when the rendering server device performs the downscaling on the original image data;

a signal processing device configured to extract one or more areas corresponding to the tracked viewpoint from each of the one or more focus image data based on the second tracking data and configured to generate multifocal VR image data by up-scaling the extracted one or more areas based on the filter data; and a display device configured to visually provide the multifocal VR image data to the user.

9. The stereoscopic image generating device of claim 8, wherein the display device includes:

a binocular display device configured to play the multifocal VR image data; and a variable focus optical system configured to adjust an angle at which the multifocal VR image data is incident on eyes of the user for a respective focal length, by synchronizing a time point, at which the multifocal VR image data is played, with a time point, at which the angle at which the multifocal VR image data is incident on the eyes of the user is adjusted for the respective focal length.

10. The stereoscopic image generating device of claim 8, wherein the sensor device includes:

a first sensor device configured to generate the first tracking data by tracking the motion of the user during the reference time interval; and a second sensor device configured to generate the second tracking data by tracking the viewpoint of the user during the reference time interval.

11. The stereoscopic image generating device of claim 8, wherein the signal processing device includes:

an image decoder configured to decode the one or more focus image data received from the image interface device;

a viewpoint synthesizer configured to extract the one or more areas corresponding to the tracked viewpoint from the decoded one or more focus image data;

an image corrector configured to generate the multifocal VR image data by up-scaling the extracted one or more areas; and a driving signal generator configured to generate a driving synchronization signal for driving the display device such that the display device visually provides the multifocal VR image data to the user.

12. The stereoscopic image generating device of claim 8, wherein the image interface device receives filter data corresponding to an image filter used in the downscaling from the rendering server device.

13. The stereoscopic image generating device of claim 12, wherein the signal processing device includes:

an up-scaling module configured to receive the filter data from the image interface device and to generate the up-scale image data by up-scaling the extracted one or more areas based on the filter data.

* * * * *